United States Patent [19]

Monestere

[11] Patent Number: 4,923,480
[45] Date of Patent: May 8, 1990

[54] OPAQUE TINTING OF CONTACT LENSES WITH RANDOM POSITIONS OF COLOR DEPTH

[75] Inventor: Martin Monestere, Kendall Park, N.J.

[73] Assignee: Allergan, Inc., Irvine, Calif.

[21] Appl. No.: 99,038

[22] Filed: Sep. 21, 1987

[51] Int. Cl.⁵ .................. D06P 5/00; D06P 1/22; D06P 1/28; C08J 7/00

[52] U.S. Cl. .................. 8/507; 8/499; 8/623; 8/624; 8/651; 351/162

[58] Field of Search ........................... 8/507

[56] References Cited

U.S. PATENT DOCUMENTS

| | | | |
|---|---|---|---|
| 3,476,499 | 11/1969 | Wichterle | 8/507 |
| 3,679,504 | 7/1972 | Wichterle | 156/62 |
| 4,157,892 | 6/1979 | Tanaka et al. | 8/507 |
| 4,252,421 | 2/1981 | Foley, Jr. | 351/162 |
| 4,447,474 | 5/1984 | Neefe | 8/507 |
| 4,494,954 | 1/1985 | Suminoe et al. | 8/507 |
| 4,518,390 | 5/1985 | Rabenau et al. | 8/507 |
| 4,582,402 | 4/1986 | Knapp | 351/162 |
| 4,634,449 | 1/1987 | Jenkins | 8/507 |
| 4,702,574 | 10/1987 | Bawa | 8/507 |
| 4,704,017 | 11/1987 | Knapp | 8/507 |
| 4,720,188 | 1/1988 | Knapp | 8/507 |

FOREIGN PATENT DOCUMENTS 122771 10/1984 European Pat. Off. .
1583492 1/1981 United Kingdom .

Primary Examiner—A. Lionel Clingman
Attorney, Agent, or Firm—George A. Skoler

[57] ABSTRACT

In opaquing and tinting a contact lens, an opaquing medium is deposited on the lens anterior surface as discrete randomly sized, randomly positioned droplets from a fine mist spray of the medium so that the ultimately formed opaque covering on the lens will correspond in appearance with the random droplet pattern. Mist spray apparatus also is provided.

14 Claims, 2 Drawing Sheets

OPAQUE TINTING OF CONTACT LENSES WITH RANDOM POSITIONS OF COLOR DEPTH

BACKGROUND OF THE INVENTION

This invention relates to the tinting or coloring of a hydrogel contact lens or other opthalmic prosthetic device, and refers more particularly to the opaquing procedure to which the lens is subjected prior to application of a specific tint or coloration to the lens.

Contact lenses can be tinted for cosmetic appearance as well as to reduce light transmission thereby providing the wearer with increased visual comfort. It is, of course, important that the tinted, or colored, lens impart a natural appearance to the wearer's eye. A natural-appearing soft contact lens should have a clear central or pupil area, a tinted intermediate or iris area and a clear outer area so that the tinted portion will not cover the sclera of the eye. Moreover, the central portion of the lens should be untinted to permit maximum light passage into the eye interior U.S. Pat. No. 4,518,390 discloses a method and apparatus with which a contact lens can be tinted. However, lenses tinted in accordance with the teaching of the '390 patent are generally limited to use by individuals having light colored eyes. For individuals with dark irises, i.e., brown eyes, a change in color is obtained only with the darkest of lens tints as the underlying color of the iris tends to dominate the overall color effect. Such eyes can only be made to appear darker, not lighter.

U.S. Pat. No. 4,634,449 discloses a method by which lenses can be tinted to provide a variety of desired color effects, whether for cosmetic reasons or otherwise, which are unimpaired by, and independent of, the color of the wearer's eyes, i e., the visual effect of the tint is not appreciably influenced or modified by the color of the wearer's eyes. This is effected by first treating a hydrogel contact lens with an opaquing of selected areas of the lens, followed by tinting of the opaqued areas with a suitable tinting agent such as a water-soluble leuco ester of a vat dye. The initial opaquing can be achieved using a variety of chemical techniques, e.g., as described in U.S. Pat. No. 3,679,504.

Both U.S. Pat. No. 4,634,449 and U.S. Pat. No. 4,518,390 mount a lens of conventional circular profile in a holder which includes means for masking a central portion and a peripheral portion of the lens anterior surface so that these surfaces are unaffected during the opaquing and tinting operations and remain clear. An annular-shaped portion of the lens anterior surface intervening the central and peripheral portions communicates with a chamber in the holder apparatus. Opaquing medium present in the chamber contacts this annular-shaped portion causing it to become opaque. Thereafter, a tinting medium (with the opaqued lens mounted in the same or a like holder) is brought into contact with the entire opaqued portion of the lens surface. Due to its opaqued, tinted portion, which corresponds to the iris of the eye, the lens of U.S. Pat. No. 4,634,449 has a general uniformity of appearance or coloration which gives a certain impression of artificiality to the lens. In other words, in lacking variation in the coloring of the opaque portion and striae as are found in the natural iris, the lens can be less natural and cosmetically appealing when worn by an individual.

SUMMARY OF THE INVENTION

The present invention provides a method and apparatus for providing a highly cosmetically appealing tinted hydrogel contact lens and does so because color variations and definition possible therewith is more simulative of a natural iris appearance than achievable with prior known opaquing and tinting procedures. This is made possible by employment of an opaquing procedure which results in giving variation to, and in the density and intensity of, the opaque medium applied to the iris portion of the lens.

The method of the invention can use the opaquing and tinting media employed in the method described in U.S. Pat. No. 4,634,449 and in some instances, the tinting of the lens can be effected with a holder and apparatus as disclosed in U.S. Pat. No. 4,518,390 and for which reason the disclosures of said patents are incorporated herein by reference.

In one aspect, the invention provides that a contact lens is mounted in an open-ended holder with its anterior surface facing upwardly, the holder employing a mandrel to hold the lens in place in a manner similar to that shown in U.S. Pat. No. 4,634,449, with the holder having an internal annular lip against which the lens is pushed, the lip serving as a mask covering a peripheral edge portion of the lens anterior face. Mounting of the lens in holder can follow the procedure described in U.S. Pat. No. 4,634,449 except that the holder does not include the central mask area of said patent. Instead, a disk such as one of paper or other suitable material will be placed centrally on the lens anterior surface in close positioned contact with that surface to create the clear pupil area. A spray unit such as a venturi-type sprayer is positioned above the holder. The sprayer is operated for a short duration to create a fine or light mist flow of an opaquing metal salt in liquid form, e.g., silver nitrate solution, which mist flow descends onto the masked face of the lens depositing thereon as discrete randomly sized and randomly positioned droplets.

Due to the surface tension interaction between the lens surface and the silver nitrate solution, the droplets remain as such with little if any coalescence one with another. The droplets can remain in place for a time, e.g., several seconds such as up to 5 seconds or more, during which period they achieve penetration of the lens material matrix as droplets. The droplets are allowed to remain in place on the lens surface for sufficient time to penetrate the lens to a penetrating depth of a few microns beneath the lens surface. However, this residence of the droplets on the lens must not be of such duration as would allow for any significant degree of coalescence of droplets or their migration into the masked pupil area of the lens, since that lens area must remain clear. After the penetration period, the holder including the lens can be immersed in a precipitating agent, e.g., a sodium chloride solution, wherein it is allowed to remain for at least about one minute during which time the sodium chloride reacts with the silver nitrate to precipitate silver chloride. When the silver chloride precipitate is thereafter exposed to light, metallic silver as the actual opaquing material will be released in the lens.

Because the silver nitrate desirably is applied on the lens surface as discrete randomly sized, randomly positioned droplets, the resulting irregular pattern of its deposition upon the lens surface will be substantially replicated in the metallic silver opaquing which is subsequently developed in the lens. Further, that metallic silver release will have variation in density and intensity in general correspondence with the mist droplet laydown placement and thickness on the lens surface, another factor which contributes to a natural appearance of the final tinted lens.

The opaqued lens is then tinted in the same manner as described in U.S. Pat. No. 4,634,449, i.e., it is exposed to a solution of water-soluble leuco ester of a vat dye which penetrates the iris portion of the lens inclusive of both opaqued and any unopaqued iris portions which may have been masked during the opaquing procedure. The dye is thereafter oxidized to regenerate the vat dye. The tinting can be carried out in a holder generally as described in U.S. Pat. Nos. 4,518,390 and 4,634,449 employing a mask over the lens central portion (pupil) and annular peripheral portion so that these portions will not be tinted but remain clear.

The invention provides that the mask used to cover the lens central portion can additionally mask portions of the annular-shaped iris defining portion, and this additional masking can be arranged in various geometric patterns, e.g., the mask can provide radial spokes extending outwardly from the pupil portion so that these spokes will represent corresponding radial spokes of tinted areas contributing to the lens coloration variation and different appearance effects possible with the practice of the invention.

In accordance with the invention, the spraying of the silver nitrate solution on the lens surface can be effected with other spraying means including a spray gun which can be operated to direct a spray of the solution against the lens surface in droplet form and with a pressure that will cause the solution to penetrate the lens surface on striking same. Where this is done and since penetration is achieved immediately, the solution does not have to remain on the surface to the extent described above where a light mist spray mode of deposition is used.

The advantages and further features of the invention will be made more apparent from the following detailed description to be given hereinafter and will be described in terms of the steps, procedures and construction as will be exemplified in the lens opaquing and tinting method and apparatus set forth, and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which.

Throughout the following description, like numerals are used to denote like parts in the drawings.

DESCRIPTION OF THE PREFERRED EMBODIMENTS

As used herein "hydrogel" is descriptive of any water absorptive, optically clear polymeric material which is suitable for the fabrication of a contact lens. Illustrative of such polymers are the water swellable, water-insoluble shape-retaining hydrogels disclosed in U.S. Pat. Nos. 2,976,576; 3,220,960; 3,882,089; 4,208,364; 4,208,365; and, 4,517,139, among others. Contact lenses formed from such materials, the so-called "soft" lens variety, become soft and pliable upon the absorption of water and in the hydrated state, are relatively comfortable to wear. They also are of relatively small dimensions, e.g., being about 0.1 mm thick in the iris region but diminishing in the pupil area to much smaller thickeners, e.g., about 0.04 mm.

Figure 2:
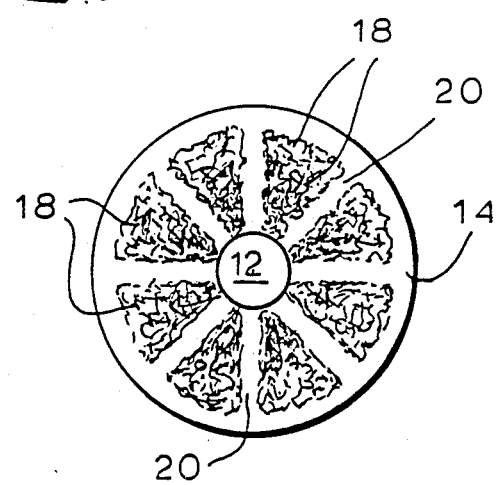
FIG. 2 is a view of the anterior surface of the contact lens after opaquing but before tinting of same, the opaquing having a pattern which includes circular spaced interruptions therein resulting from the use of a radially spoked opaquing mask.
Figure 3:
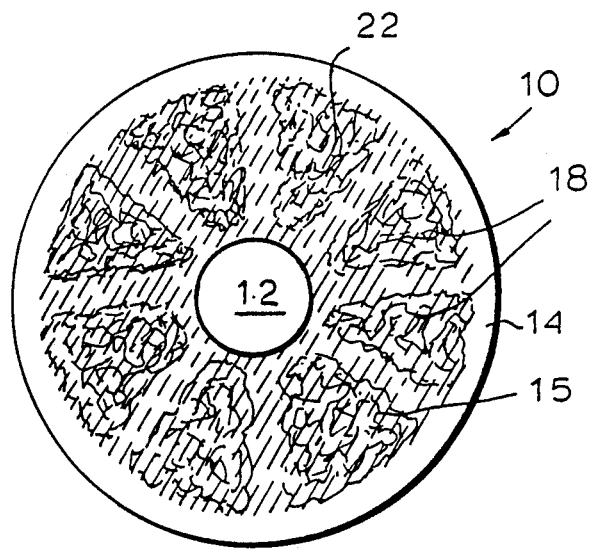
FIG. 3 is a view similar to FIG. 2 but showing the lens anterior surface after tinting; and, FIG. 4 is a plan view of the type of mask which is positioned centrally on the anterior surface of the lens prior to the opaquing procedure to produce the opaquing effect shown in FIG. 2.

Referring to FIG. 3, there is shown a hydrogel contact lens 10, the anterior surface thereof facing the viewer, the lens being opaqued and tinted in accordance with the present invention. Lens 10 has a clear central portion 12 (pupil portion), a clear peripheral portion 14 (sclera portion) and intervening those two portions, an annular-shaped portion 15 (iris portion), that portion 15 being the opaqued and tinted part. The opaquing 18 of the depicted embodiment is of gray/white coloration and is present in the pattern of circularly spaced formations of random, irregular, color varying, density varying opaque medium make-up. The opaque pattern as such is seen with reference to FIG. 2 showing the lens before tinting. As can be seen from FIG. 2, the opaque formations in annular portion 15 can be intervened by bands 20 of unopaqued surface extending radially from central portion 12. These bands will be tinted a particular color in the tinting procedure and result from the use of a particular mask overlay on portion 15 during the opaquing procedure. Other formations can be defined by using other mask shapes and a continuous annular opaquing formation can be effected by leaving portion 15 unmasked.

With reference again to FIG. 3, lens 10 is tinted as at 22, the tinting covering both the opaqued formation and the unopaqued bands in anterior surface portion 16, the tint of the depicted embodiment being of aqua or light green coloration. The sum and result of providing lens 10 with the opaquing and tinting as shown, is to produce a more natural iris pattern and eye appearance in lens portion 16 and the lack of uniformity in the opaquing allows certain striae and other definition of the wearer's natural iris to show through the lens to further enhance the natural eye appearance of the lens.

For effecting opaquing of lens 10, a variety of opaquing materials, e.g., those described in U.S. Pat. No. 3,476,499, can be used with good results. The opaquing medium is initially provided as a metal salt, for example, metallic silver, gold, and platinum, each of which can produce an opaque effect in a hydrogel lens, and can be precipitated from solutions of their salts within the hydrogel by means of hydrazine, reducing sugars, or formaldehyde, respectively. Opaquing precipitates can also be formed by reacting suitable impregnating and precipitating agents with the reaction product thereafter being selectively exposed to light. A particularly useful impregnating agent is silver nitrate which will react with a halide salt, e.g., sodium chloride, to precipitate the corresponding silver halide salt which is light sensitive.

Thus, after a suitable period of exposure to light, the silver halide will form an opaque precipitate within the unmasked portion of the hydrogel lens which is resistant to loss by tearing or the wiping action of the eyelids. The opaquing materials herein are physiologically inert. They cannot chemically irritate the eye nor can they actually come in contact with it in significant amounts as they are unable to migrate in the hydrogel material.

Figure 1:
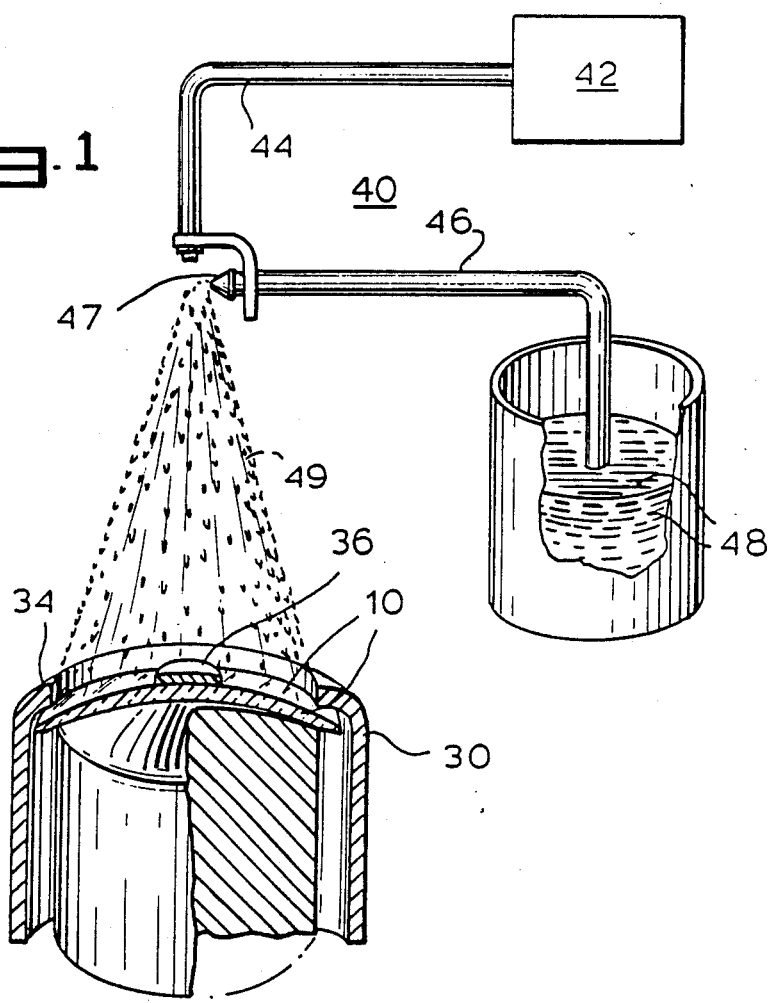
FIG. 1 is a diagrammatic depiction of the method of the invention illustrating the use of a venturi-type spray unit to effect a light mist spray deposit of opaquing medium on the anterior surface of a hydrogel contact lens mounted in a holder and held in place therein with a mandrel.

With reference, now, to FIG. 1, the opaquing procedure and apparatus of the present invention will be described. Lens 10 is mounted anterior face upwardly in tubular, open-ended holder 30, with mandel 32 being positioned at the posterior face of the lens for urging the peripheral portion 14 of the lens against the internal annular lip 34 on holder 30 so that this lip serves as a peripheral portion mask for the lens. A mask such as a disc 36 of paper or other protective material is positioned centrally on top of the lens in good close covering contact with the lens surface to demark and mask over the central portion 12 of the lens as constitutes the clear, central pupil portion which must not be effected by the ensuring opaquing and tinting operations carried out on the lens.

A venturi-type spray unit shown generally at 40 is positioned above holder 30 Spray unit 40 includes a source 42 of air under pressure, a tube 44 leading therefrom and terminating adjacent a feed line 46 which in turn extends into a source 48 of opaquing medium, e.g., a 1-10 weight % aqueous solution of silver nitrate. Desirably, the solution will contain silver nitrate in the range of about 2-8 weight and more desirably in the range of about 3-6 weight %. The tip ends of tube 44 and feed line 46 are arranged in close proximity as shown so that a stream of pressurized air from tube 44 will create an aspirating or venturi effect at the tip end of feed line 46 to withdraw a flow of the opaquing medium from source 48 through, and outwardly from, the feed line. The venturi will be so operated that the outward flow from feed line 46, which has a nozzle-like tip end 47, will issue as a fine stream which is broken up into a light fine mist spray by the air issuing from tube 44. The fine mist spray will exist as discrete random sized droplets of silver nitrate solution which descend as at 49 onto the anterior surface of the lens and deposit thereon in a random pattern. In general, these deposited droplets will have a range of sizes characteristic of a venturi-type spray formation and due to the surface tension interaction between the lens surface and the silver nitrate solution, the deposited droplets will tend to retain their individuality and not coalesce to any appreciable extent. Thus the random character of the droplet sizing and positioning will be carried forward in the opaquing procedure and the ultimate lens end product characterized by a correspondingly random, irregular opaquing. Prior to depositing the silver nitrate on the lens anterior surface, any excess moisture thereon can be removed as by blotting with a suitable blotting member.

Spray application of the opaquing medium will last only a short period, e.g., about 5 seconds. The deposited silver nitrate is allowed to remain in place on the lens surface for such period as to allow for the opaquing medium to penetrate the lens to a penetrating depth of a few microns below the lens surface while avoiding such residence of the solution on the lens as would result in significant droplet coalescence or solution migration from the iris area into the pupil area. The period the solution is allowed to remain on, and penetrate, the lens can be, e.g., up to about 2 minutes during which time the discrete and individually characteristic droplets penetrate the lens material matrix. That time period will be less if a pressurized spray of solution is directed against the lens surface since penetration of the lens surface will then occur quite rapidly At the end of the penetration period, the lens still fixed in the holder is immersed in a bath of sodium chloride (e.g. a 0.9% solution thereof) which serves to precipitate silver alide at the lens surface. After about one minute, the holder and lens are removed from the sodium chloride bath. The lens is then removed from the fixture, rinsed with saline and packaged in a clean septum vial half-filled with saline and provided with crimp cap closure.

The vial with the contained lens is now exposed to a source of light such as an infrared heat lamp for a developing time period which can, e.g., be from about 1 to about 1½ hours so that opaquing coloration develops. During this developing period, the silver halide will release metallic silver as the actual opaquing material and the opacity will intensify as development proceed, with the opaque material generally taking on a white/-gray coloration.

After the development period, the lens is removed from the vial for tinting. Tinting can be practiced in the manner and with the materials disclosed in U.S. Pat. No. 4,634,449 patent, i.e., the opaqued lens is centered in a lens mounting apparatus which is fitted out and assembled with the entire assembly mounted in the inverted position as shown in FIG. 8 of said patent. The tinting operations preferably will be carried out at elevated temperature, e.g., at from about 50° C. to about 60° C., for overall best results.

The preferred procedure for tinting the opaqued lens as taught in the U.S. Pat. No. 4,634,449 patent comprises applying a solution of a water-soluble leuco ester of a vat dye to the lens followed by treatment with an oxidizing agent to regenerate the vat dye.

The solution of the water-soluble leuco ester of the vat dye will be employed as an aqueous solution having a concentration of dye of from about 0.1 % to about 25 weight %. In addition to the employment of aqueous solutions, the water-soluble leuco ester of the vat dye may be dissolved in various organic solvents or mixtures of such solvents, with water.

The organic solvents, if used, should be water-miscible and of relatively high volatility for quick evaporation. The oxidation step will be carried out as described in U.S. Pat. No. 4,634,449 by adding an acid and reducing agent together or sequentially in any order.

Following regeneration of the vat dye to the desired state of color development, the acid will be neutralized to terminate the oxidation reaction and the lens is thoroughly washed with distilled water to remove all traces of reagents and unoxidized dye.

Figure 4:
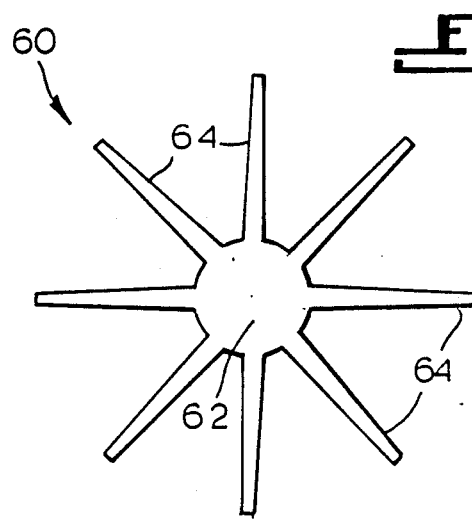

FIG. 4 shows a mask 60 which can be used during the opaquing procedure to mask the lens anterior face. It includes a central area 62 for covering the pupil portion of the lens and a number of radial spokes 64 extending outwardly from area 62 which define lens surface bands 20 that will not become opaqued.

It will be understood that variations readily can be made in the above-disclosed invention. For example, mask shapes other than those noted can be used to yield variations in the opaquing pattern. Similarly, the opaquing solution strength can be varied anywhere within the disclosed range, a 4 weight % solution giving particularly good opaquing results. Accordingly, it will be understood that like such variations can be made by those of ordinary skill in the art without departing from the scope of the inventive concept disclosed.

What is claimed is:

1. In a method for tinting a hydrogel contact lens which includes applying a liquid solution of metal salt as an opaquing medium to a selected portion of one face of the lens and reacting the salt with a precipitating agent to form a metallic precipitated which precipitate when exposed to light releases metal therefrom as an opaque covering on the lens face, and thereafter tinting the opaque covered portion of the lens face with a solution of a water-soluble leuco ester of a vat dye which penetrates said opaque covering with the dye thereafter oxidized to regenerate the vat dye, the improvement which comprises applying the liquid solution of salt to the selected portions of said one face of the lens as discrete randomly sized, randomly positioned droplets thereof whereby the opaque covering resulting therefrom will possess random size and positioning.

2. The method of claim 1 in which the liquid solution of metal salt is applied to the lens face as a spray.

3. The method of claim 2 in which the spray is a fine mist spray.

4. The method of claim 3 in which the fine mist spray is applied with a venturi-type sprayer.

5. The method of claim 1 in which a predetermined time period intervenes application of the liquid droplets to the lens surfaces and the reacting thereof with the precipitating agent.

6. The method of claim 5 in which the predetermined time period is one sufficient to allow the opaquing medium to penetrate the lens to a penetrating depth below the lens surface.

7. The method of claim 1 in which the liquid droplets are reacted with the precipitating agent by immersing the lens in a bath of the precipitating agent.

8. The method of claim 1 in which the metal salt is one which undergoes reaction with a precipitating agent to provide a metallic opaquing material selected from the group consisting of silver, gold or platinum.

9. The method of claim 8 in which the metal salt is silver nitrate, the precipitating agent is a halide salt and the precipitated halide is sensitive to light.

10. The method of claim 1 comprising masking the one face of the lens at other than said selected portion.

11. The method of claim 10 in which a central portion and a peripheral portion of the said one lens face is masked, the intervening face portion constituting the selection portion to be opaqued.

12. The method of claim 11 further comprising additionally masking portions of said one lens face in radial bands extending outwardly from the central portion in the direction of the peripheral portion.

13. A hydrogel contact lens tinted in accordance with the method of claim 1.

14. A hydrogel contact lens possessing one or more tinted areas, said tinted areas comprising an opaque substrate made up of non-uniformly distributed opaquing medium and a tinting medium superimposed upon said opaque substrate.

* * * * *